(12) United States Patent
Yim et al.

(10) Patent No.: US 12,311,744 B2
(45) Date of Patent: May 27, 2025

(54) DOOR HINGE DEVICE FOR VEHICLE

(71) Applicants: Hyundai Motor Company, Seoul (KR); Kia Corporation, Seoul (KR); Pyeong Hwa Automotive Co., Ltd., Daegu (KR)

(72) Inventors: Chungsik Yim, Anyang-si (KR); Soo Bok Kim, Incheon (KR); Hyungin Yun, Seoul (KR); Ki-Ryun Ahn, Daegu (KR)

(73) Assignees: Hyundai Motor Company, Seoul (KR); Kia Corporation, Seoul (KR); Pyeong Hwa Automotive Co., Ltd., Daegu (KR)

( * ) Notice: Subject to any disclaimer, the term of this patent is extended or adjusted under 35 U.S.C. 154(b) by 459 days.

(21) Appl. No.: 17/963,853

(22) Filed: Oct. 11, 2022

(65) Prior Publication Data
US 2023/0202270 A1 Jun. 29, 2023

(30) Foreign Application Priority Data
Dec. 28, 2021 (KR) .......................... 10-2021-0189372

(51) Int. Cl.
*B60J 5/04* (2006.01)
*E05F 1/12* (2006.01)
*E05F 15/622* (2015.01)

(52) U.S. Cl.
CPC .............. *B60J 5/0477* (2013.01); *E05F 1/12* (2013.01); *E05F 15/622* (2015.01); *E05Y 2201/412* (2013.01); *E05Y 2201/426* (2013.01); *E05Y 2900/531* (2013.01)

(58) Field of Classification Search
CPC .......................... B60J 5/0477; B60J 5/0479; B60J 2005/0475; E05F 15/622; E05F 1/12; E05Y 2201/412; E05Y 2201/426; E05Y 2900/531
USPC ..................................... 296/146.11
See application file for complete search history.

(56) References Cited

U.S. PATENT DOCUMENTS

| | | | |
|---|---|---|---|
| 6,997,504 B1 * | 2/2006 | Lang ....................... | E05D 3/127 |
| | | | 296/146.12 |
| 12,110,721 B2 * | 10/2024 | Yun ........................ | E05D 3/022 |
| 12,146,356 B2 * | 11/2024 | Yim ........................ | E05D 15/58 |
| 12,188,285 B2 * | 1/2025 | Lee ........................ | E05F 15/622 |
| 2009/0051194 A1 * | 2/2009 | Elliott ....................... | B60J 5/06 |
| | | | 296/146.11 |
| 2010/0295337 A1 * | 11/2010 | Elliott ................... | E05D 15/101 |
| | | | 296/202 |
| 2011/0010998 A1 * | 1/2011 | Elliott ................... | E05D 15/101 |
| | | | 49/260 |

(Continued)

FOREIGN PATENT DOCUMENTS

KR 10-2019-0028966 A 3/2019

*Primary Examiner* — Gregory A Blankenship
(74) *Attorney, Agent, or Firm* — Morgan, Lewis & Bockius LLP

(57) ABSTRACT

A door hinge device for a vehicle enables a stable opening and closing operation of a door, in the vehicle without a B pillar, in which a fixing latch portion configured in a hinge slider restrains a striker fixed to a case and fixes a slide movement position of the hinge slider, in a state where the hinge slider connected to a hinge portion of the door slidably moves in a diagonal direction outside a body along a rail inside a case and secures a rotation trajectory of the door.

14 Claims, 12 Drawing Sheets

(56) References Cited

U.S. PATENT DOCUMENTS

| | | | | |
|---|---|---|---|---|
| 2016/0129769 A1* | 5/2016 | Choi | E05D 15/101 | 49/159 |
| 2022/0389744 A1* | 12/2022 | Lee | E05D 3/127 | |
| 2022/0412137 A1* | 12/2022 | Lee | E05F 15/56 | |
| 2022/0412142 A1* | 12/2022 | Lee | E05D 15/04 | |
| 2023/0191883 A1* | 6/2023 | Kume | E05D 15/101 | 16/336 |
| 2023/0202270 A1* | 6/2023 | Yim | E05F 1/12 | 296/146.11 |
| 2023/0202271 A1* | 6/2023 | Yim | B60J 5/0479 | 16/246 |
| 2023/0203855 A1* | 6/2023 | Kim | E05B 85/26 | 292/200 |
| 2023/0203862 A1* | 6/2023 | Yun | B60J 5/0479 | 16/233 |
| 2023/0203863 A1* | 6/2023 | Yun | B60J 5/0479 | 16/233 |
| 2023/0203867 A1* | 6/2023 | Yun | E05D 15/58 | 296/146.1 |
| 2023/0220719 A1* | 7/2023 | Yim | E05F 15/622 | 49/70 |
| 2024/0218712 A1* | 7/2024 | Kim | E05B 77/38 | |
| 2024/0218713 A1* | 7/2024 | Kim | E05B 83/38 | |
| 2024/0247532 A1* | 7/2024 | Lee | B60J 5/048 | |
| 2024/0300306 A1* | 9/2024 | Kim | B60J 5/0479 | |

\* cited by examiner

DOOR HINGE DEVICE FOR VEHICLE

CROSS-REFERENCE TO RELATED APPLICATION

The present application claims priority to Korean Patent Application No. 10-2021-0189372 filed on Dec. 28, 2021, the entire contents of which is incorporated herein for all purposes by this reference.

BACKGROUND OF THE PRESENT DISCLOSURE

Field of the Present Disclosure

The present disclosure relates to a door hinge device for a vehicle, and more, a door hinge device for a vehicle that enables an opening and closing operation of each door independently by pushing a hinge portion of a door to the outside of the body and securing a rotation trajectory in the vehicle without a B pillar.

Description of Related Art

In general, a vehicle door is a door that separates the inside and outside of a vehicle and performs an important function of blocking external noise, rain, dust, wind, etc., absorbing the impact together with a side structure in case of a side collision to safely protect a passenger.

The vehicle door has various types including a special purpose door, but a hinge type swing door is most often applied to a passenger vehicle.

In general, a swing door refers to a door that opens toward the outside of the body with respect to a hinge shaft provided through a hinge bracket between the swing door and a body, and has advantage of easy opening and closing and easy maintenance and repair because of a simple structure.

On the other hand, in some vehicles, when the door is opened, an opposed type swing door is applied, which has a large opening feeling and is advantageous for a passenger to get on or off the vehicle.

Such opposed type swing doors are divided into a type without a B pillar and a type with a B pillar.

FIG. 1 is a side view exemplarily illustrating a vehicle to which an opposed type swing door is applied for instance of the related art, and FIG. 2 is a cross-sectional view exemplarily illustrating a portion in the vehicle of FIG. 1 in which a front door and a rear door contact each other.

First, referring to FIG. 1 and FIG. 2, an example of the opposed type swing door applied to a vehicle 100 without a B pillar is shown. In a front door 110, a hinge portion is provided at the front end portion of the front door 110, and in a rear door 120, the hinge portion is provided at the rear end portion of the rear door 120.

In the opposed type swing door, a latch unit LC for maintaining a locking state is provided on one side of the front door 110 or the rear door 120.

Furthermore, a sealing S for airtightness is provided between the rear end portion of the front door 110 and the front end portion of the rear door 120.

As described above, the opposed type swing door of the vehicle 100 without the B pillar has a good opening feeling when the passenger gets on or off or during leisure activities, but when the front door 110 and the rear door 120 are opened and closed, there is a disadvantage that the opening/closing order is previously determined, such as having to firstly open or close the front door 110 due to an interference problem in that rotational trajectories overlap between the front door 110 and the rear door 120.

As described above, because the opening and closing order of the front door 110 and the rear door 120 is previously determined, there is a problem in that the rear door 120 cannot be opened or closed alone.

FIG. 3 is a side view exemplarily illustrating a vehicle to which an opposed type swing door is applied according to another example of the related art, and FIG. 4 is a cross-sectional view exemplarily illustrating a portion in the vehicle of FIG. 3 in which a front door and a rear door contact each other.

Referring to FIG. 3 and FIG. 4, an example of the opposed swing door applied to a vehicle 200 with a B pillar 230 is shown. Also, in a front door 210, a hinge portion is provided at the front end portion of a front door 210, and in a rear door 220, the hinge portion is provided at the rear end portion of a rear door 220.

In the opposed type swing door, the latch unit LC for maintaining a locking state is provided between each side of the front door 210 and the rear door 220 and the B pillar 230.

Furthermore, the sealing S for airtightness is provided between the rear end portion of the front door 210 corresponding to the B pillar 230 and the front end portion of the rear door 220 and the B pillar 230.

As described above, the opposed type swing door of the vehicle 100 with the B pillar 230 has an advantage in that an operation order is free because the front door 210 and the rear door 220 are configured to rotate with respect to the B pillar 230 so that the opening and closing operation is possible independently of each other, there is a problem in that a feeling of openness deteriorates when a passenger gets on or off or when a leisure activity is performed due to the application of the B pillar 230.

Accordingly, the opposed type swing door has a difference in the opening feeling depending on the presence or absence of the B pillar, and a difference in the opening and closing operation of the front door and the rear door.

On the other hand, as described above, to solve the problem of the operation order of the front door 110 and the rear door 120 while maintaining the opening feeling of the vehicle 100 without the B pillar, generally, there is an example in which a gooseneck-type hinge device is applied as a door hinge device for the opposed type swing door, but the gooseneck-type hinge device requires a lot of available space in the width direction of a body due to the characteristic of its shape, which makes it difficult to configure a body layout.

Accordingly, to apply the opposed type swing door to a vehicle without a B pillar, a door hinge device for implementing a new opening/closing structure is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door hinge device for a vehicle having advantages of facilitating a stable opening and closing operation of a door in the vehicle without a B pillar, in which a hinge slider connected to a hinge portion of the door slidably moves in a diagonal direction outside a body along a rail inside a case and secures a rotation trajectory of the door, and then a fixing latch portion configured in the hinge slider restrains a striker fixed to the case and fixes a slide movement position of the hinge slider.

Various aspects of the present disclosure are directed to providing a door hinge device for a vehicle including a case provided in a diagonal direction toward outside of a body on one side of the body corresponding to one end portion of the door, rails disposed in a longitudinal direction, respectively on internal upper and lower sides of the case, and a hinge slider connected to a door hinge bracket fixed to one end portion of the door through a hinge shaft while slidably movable provided along the rails inside the case, a striker provided on one internal side of the case; and a fixing latch portion provided on one side of the hinge slider inside the case, and at a position where the hinge slider slidably moves in a diagonal direction outside the body, configured to constrain or release the striker through a claw lever and a pawl lever on the base plate.

One end portion of the door may include a front end portion of a front door or a rear end portion of a rear door.

The striker may be fixed to one internal side of the case to be constrained to the claw lever in a state in which the hinge slider slidably moves in the diagonal direction outside the body.

The fixing latch portion may include a base plate fixed to a lower side of the hinge slider and including an insertion groove formed at one side corresponding to the striker; a claw lever including a restraint groove restraining the striker on a first side thereof, an engaging end portion limiting rotation of the claw lever in one direction on a second side thereof, and rotatably pin-coupled to the base plate in correspondence to an internal side of the insertion groove; a pawl lever including a support end portion operating on the engaging end portion formed on a first side thereof, a locking groove formed on a second side thereof, and a detection end portion protruding from one side between the support end portion and the locking groove, and rotatably pin-coupled to the base plate in correspondence to one side of the claw lever; and a solenoid including an operating rod selectively operating on the locking groove of the pawl lever and fixed to the base plate in correspondence to one side of the pawl lever.

The fixing latch portion may further include a pawl switch fixed to the base plate in correspondence to the detection end portion of the pawl lever to detect a rotational position of the pawl lever by detecting a position of the detection end portion of the pawl lever.

The fixing latch portion may further include a claw damper provided on a first side of the base plate to support a side surface of the claw lever and suppress a rotation of the claw lever; and a pawl damper provided on a second side surface of the base plate to support a side surface of the pawl lever and suppress a rotation of the pawl lever.

The fixing latch portion may further include a claw spring mounted onto a pin of the claw lever to elastically support the claw lever in a rotation direction in which a restraint of the striker is released; and a pawl spring mounted onto a pin of the pawl lever to elastically support the pawl lever in a rotation direction in which the support end portion supports the engaging end portion of the claw lever.

The hinge slider may include an internal hinge slider including each of upper and lower sides connected to be slidably movable along the rail through a slider inside the case; and an external hinge slider integrally connected to the internal hinge slider through a guide slot formed on an external surface of the case outside the case, and including a tip portion hinged to the door hinge bracket through a hinge shaft.

The external hinge slider may include an upper external hinge bar integrally connected to one upper side of the internal hinge slider through an upper guide slot formed in an upper external surface of the case outside the case; a lower external hinge bar integrally connected to one lower side of the internal hinge slider through a lower guide slot formed in an external lower surface of the case from outside the case; and an external connection bar connecting the upper and lower external hinge bars outside the case.

The door hinge bracket may include an upper door hinge bracket fixed to one upper side of the door and hinged to a tip portion of the upper external hinge bar through a hinge shaft; and a lower door hinge bracket fixed to one lower side of the door and hinged to a tip portion of the lower external hinge bar through the hinge shaft.

The door hinge device may further include a driving unit configured to provide a driving force so that the hinge slider, to which a nut bracket provided on a screw disposed in the longitudinal direction inside the case is connected, slidably moves along the rail according to driving of the motor.

The driving unit may include a motor fixed on an internal section of the case; a reducer configured on a motor shaft of the motor to reduce and output a rotation force of the motor; a screw disposed in parallel to the rail and including one end portion connected to the reducer, and the other end portion rotatably provided on the internal section of the case through a bearing member; and a nut bracket movably provided on the screw and including one side fixed to the hinge slider.

The door hinge device for a vehicle according to various exemplary embodiments of the present disclosure may, in the vehicle without the B pillar, fix the slide movement position of the hinge slider by restraining the striker fixed to the case through the fixing latch portion on the hinge slider in a state where the hinge slider connected to the hinge portion of the door slidably moves along the rail in the diagonal direction outside the body by the driving force of the motor to secure the rotation trajectory of the door.

Accordingly, it is possible to open or close both doors simultaneously, or to open or close one door alone.

Furthermore, the hinge portion of the door automatically may slidably move in the diagonal direction of the outside of the body along the hinge slider by the driving force of the motor, and then restrain the striker through the fixing latch portion to remain the slide movement position of the hinge slider in the fixing state even if the motor is not separately controlled, and accordingly, the door opening and closing operation may be stably achieved.

The door hinge device for the vehicle according to various exemplary embodiments of the present disclosure has an effect of maintaining the advantage of a good opening feeling when a passenger gets on or off or during leisure activities in the opposed type swing door of the vehicle without a B-pillar, and not being affected by the order opening and closing order even in the opening and closing operation of each door.

Furthermore, the door hinge device for the vehicle according to various exemplary embodiments of the present disclosure is slim compared to the gooseneck type hinge device of the related art, and requires no available space according to the operating radius, and thus there is an advantage of having availability in the vehicle layout configuration.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
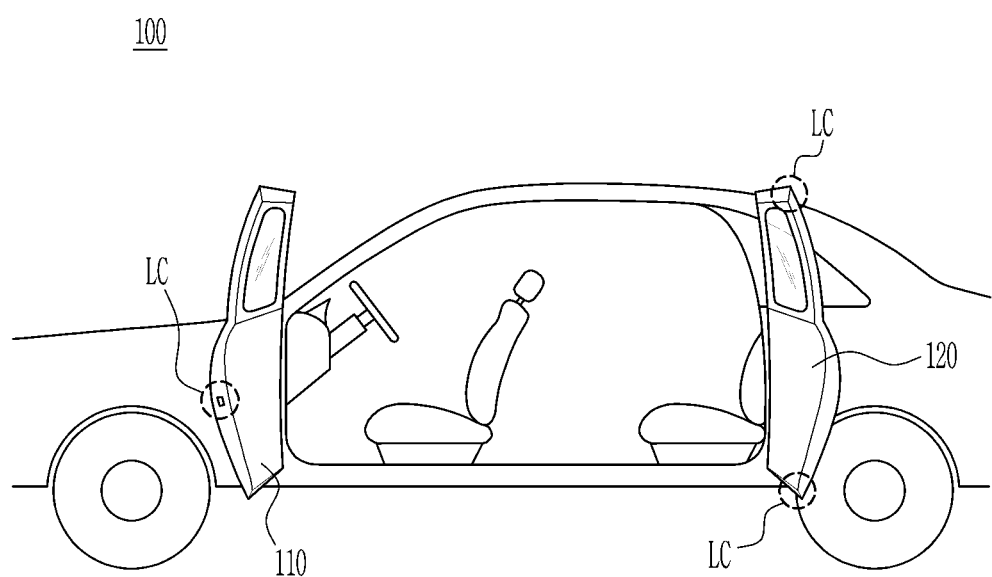
FIG. 1 is a side view exemplarily illustrating a vehicle to which an opposed type swing door is applied according to an example of the related art.
Figure 2:
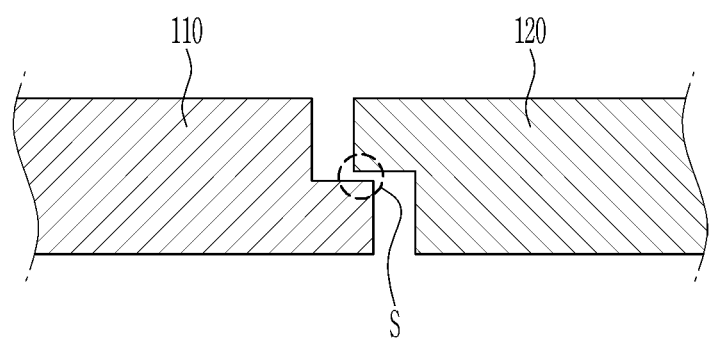
FIG. 2 is a cross-sectional view exemplarily illustrating a portion in the vehicle of FIG. 1 in which a front door and a rear door contact each other.
Figure 3:
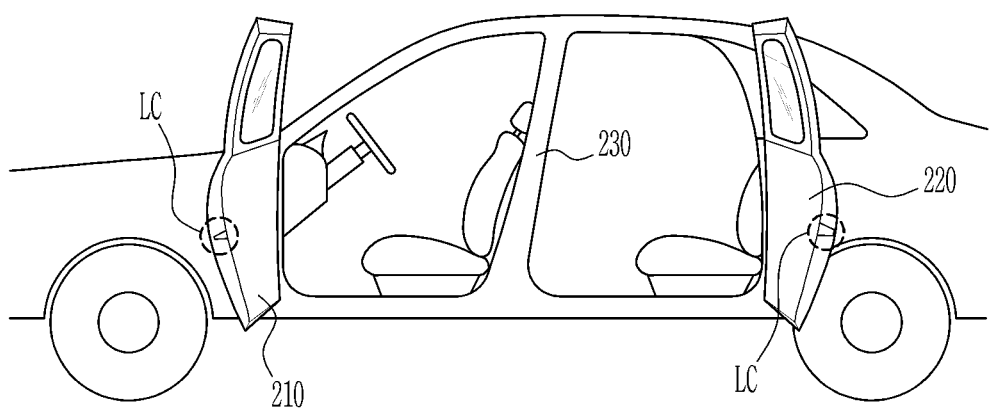
FIG. 3 is a side view exemplarily illustrating a vehicle to which an opposed type swing door is applied according to another example of the related art.
Figure 4:
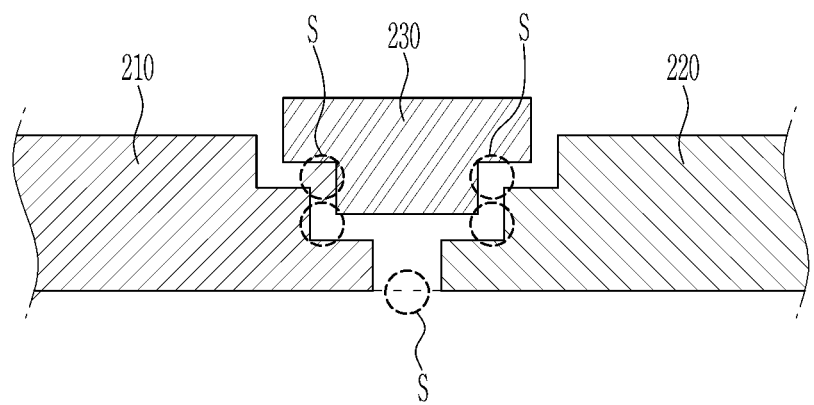
FIG. 4 is a cross-sectional view exemplarily illustrating a portion in the vehicle of FIG. 3 in which a front door and a rear door contact each other.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Various exemplary embodiments of the present disclosure will hereinafter be described in detail with reference to the accompanying drawings.

However, because the size and thickness of each component shown in the drawings are arbitrarily indicated for convenience of description, the present disclosure is not necessarily limited to those shown in the drawings, and the thickness is enlarged or reduced to clearly express various portions and regions. Furthermore, to clearly describe the exemplary embodiment of the present disclosure, parts irrelevant to the description are omitted.

Figure 5:
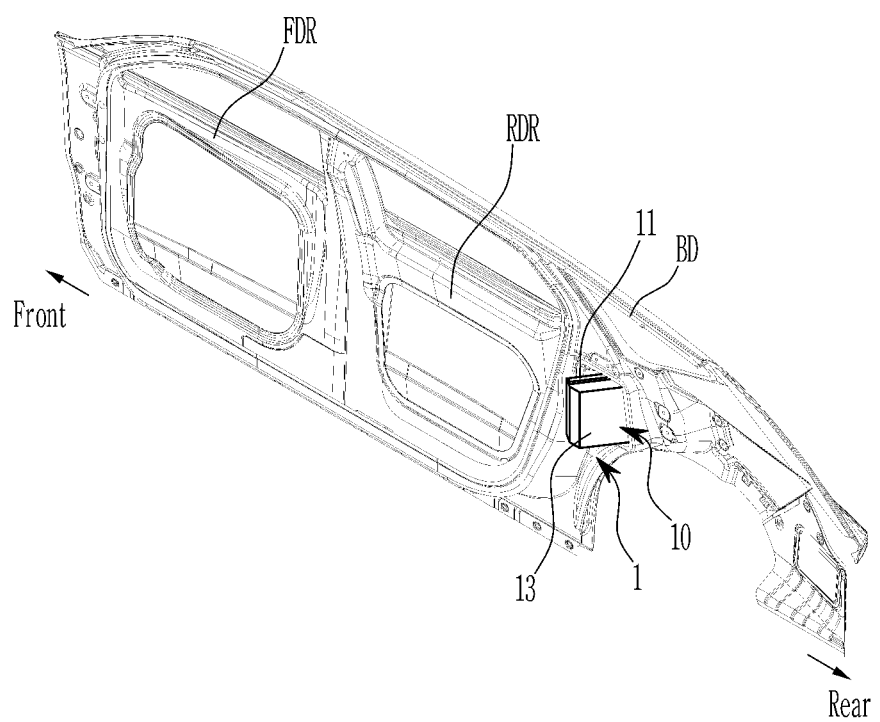
FIG. 5 is an internal perspective view of a vehicle door to which a door hinge device for a vehicle according to various exemplary embodiments of the present disclosure is applied.

In describing the exemplary embodiment of the present disclosure, for convenience of description, an upper left direction of FIG. 5 is defined as the front, and a lower right direction is defined as the rear. Furthermore, the door hinge device for the vehicle according to various exemplary embodiments of the present disclosure applied to a rear door behind a passenger seat will be referred to as an example.

Figure 6:
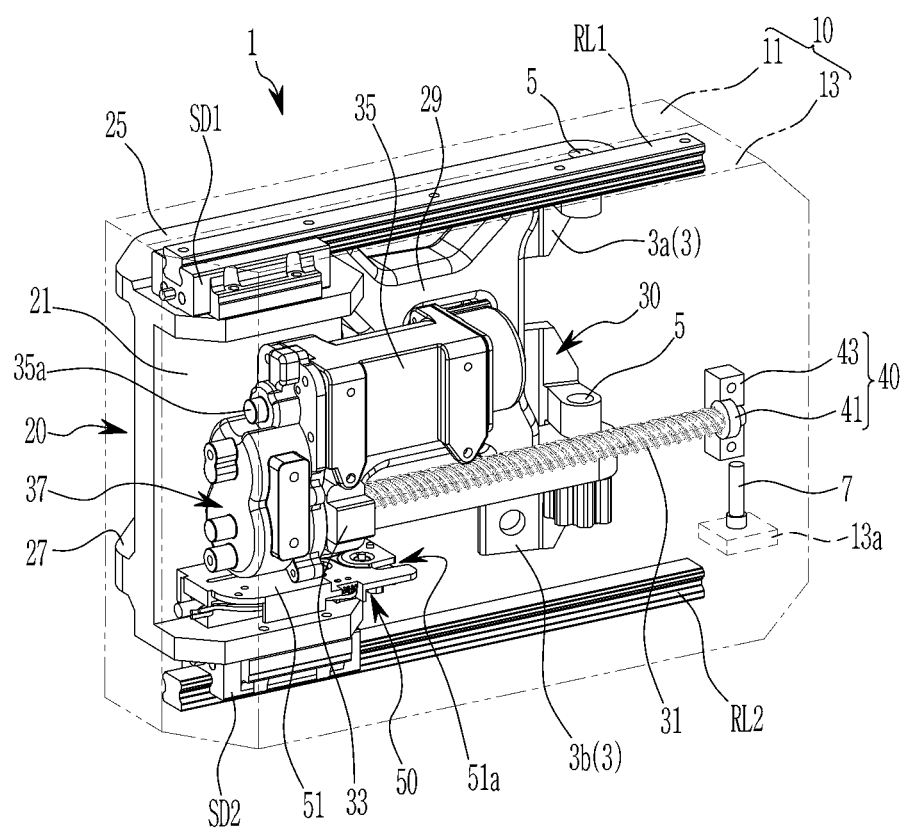
FIG. 6 and FIG. 7 are perspective views of a case of the door hinge device for the vehicle according to various exemplary embodiments of the present disclosure.
Figure 7:
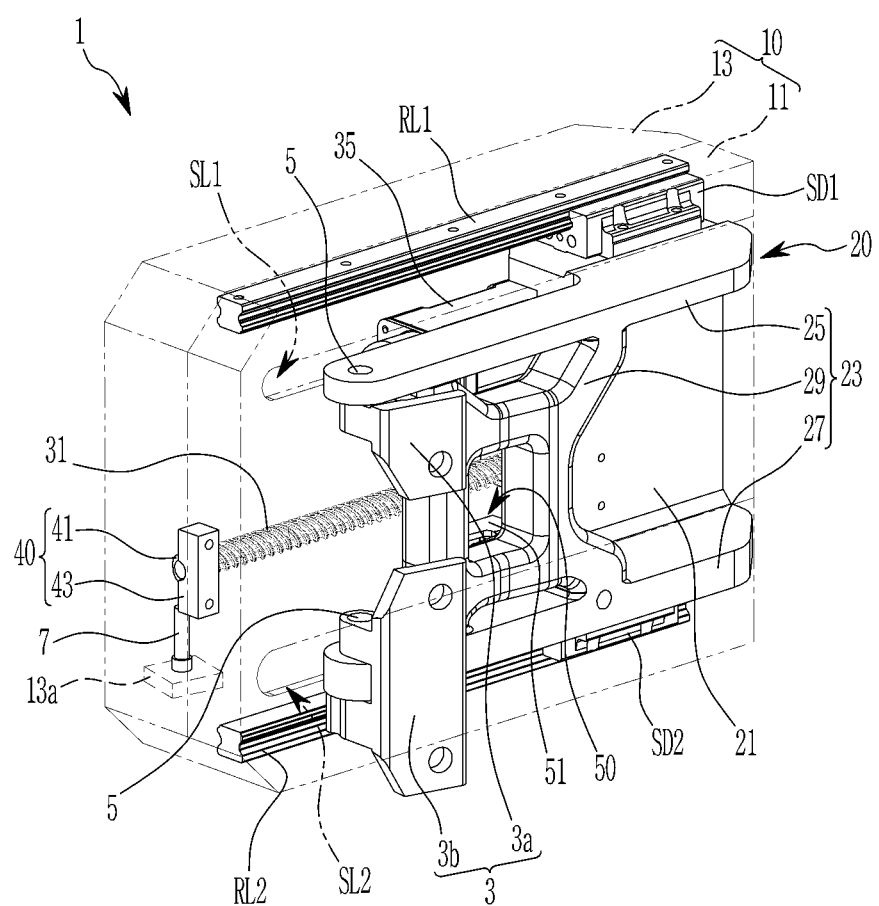
Figure 8:
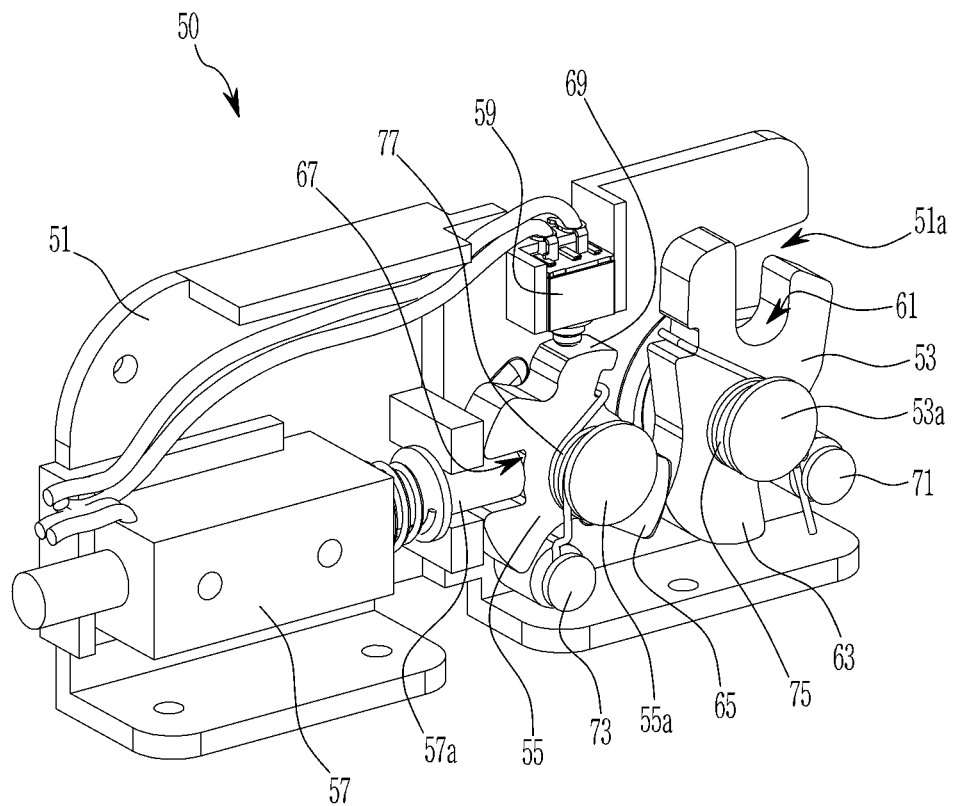
FIG. 8 is a perspective view of a fixing latch portion applied to the door hinge device for the vehicle according to various exemplary embodiments of the present disclosure.

FIG. 5 is an internal perspective view of a vehicle door to which a door hinge device for a vehicle according to various exemplary embodiments of the present disclosure is applied, FIG. 6 and FIG. 7 are perspective views of a case of the door hinge device for the vehicle according to various exemplary embodiments of the present disclosure, and FIG. 8 is a perspective view of a fixing latch portion applied to the door hinge device for the vehicle according to various exemplary embodiments of the present disclosure.

A door hinge device 1 for a vehicle according to various exemplary embodiments of the present disclosure applied to a rear door behind a passenger seat of a passenger vehicle without a B pillar is referred to as an exemplary embodiment of the present disclosure, but is not limited thereto, and may also be applied between a both front door FDR and a body BD of the passenger vehicle without the B-pillar, and between a both rear door RDR and the body BD.

That is, when the door is opened or closed, in a state where the front door FDR or the rear door RDR moves to the outside of the body BD in a diagonal direction in the front of the body BD or in the rear of the body BD to secure a rotation trajectory of each door, the door hinge device 1 enables opening and closing of both doors simultaneously or opening and closing of one door alone.

Referring to FIGS. 5 to 8, the door hinge device 1 for the vehicle according to various exemplary embodiments of the present disclosure may include a case 10, a hinge slider 20, a driving unit 30, a striker 7, and a fixing latch portion 50.

The case 10 is provided in the diagonal direction toward the outside of the body BD on one side of the body BD corresponding to one end portion of the door DR.

Here, the door DR may be the front door FDR or the rear door RDR, and may refer to these simultaneously. That is, in the case of the front door FDR, one end portion may be one side of the front end portion of the front door FDR, and in the case of the rear door RDR, one end portion may be one side of the rear end portion of the rear door RDR.

Furthermore, one side of the body BD on which the front door FDR is provided means one front side of the body BD, and in this regard, the front door FDR may be provided in the diagonal direction toward a front external side of the body BD.

Furthermore, one side of the body BD on which the rear door RDR is provided means one rear side of the body BD, and in this regard, the rear door RDR may be provided in the diagonal direction toward a rear outside of the body BD.

Furthermore, the case 10 has two guide slots SL1 and SL2 formed on the external surface, and an upper rail RL1 and a lower rail RL2 provided on the upper side and the lower side of the inside in the longitudinal direction, respectively.

That is, the case 10 is formed by assembling an external case 11 and an internal case 13 to each other.

The external case 11 faces the outside of the body BD, and is cut in the upper and lower portions on a cross-section in the longitudinal direction so that the upper guide slot SL1 and the lower guide slot SL2 are formed in parallel to each other.

The internal case 13 faces the internal side of the body BD and is mounted with the external case 11.

Furthermore, the upper rail SL1 is disposed in the longitudinal direction along an internal coupling portion of the external case 11 and the internal case 13 and fixed to an internal upper surface, and the lower rail SL2 is disposed in the longitudinal direction along the internal coupling portion of the external case 11 and the internal case 13 and fixed to an internal lower surface.

Furthermore, the hinge slider 20 is provided between the external case 11 and the internal case 13 through the upper rail RL1 and the lower rail RL2, and the driving unit 30 is provided on the internal section of the internal case 13.

Furthermore, the fixing latch portion 50 is provided at one lower side of the hinge slider 20 in the inside between the external case 11 and the internal case 13.

The hinge slider 20 is provided to be slidably movable along the upper rail RL1 and the lower rail RL2 through two sliders SD1 and SD2 inside the case 10, and is connected through a hinge shaft 5 to a door hinge bracket 3 fixed to one end portion of the door DR from the outside of the case 10 through the two guide slots SL1 and SL2.

That is, the hinge slider 20 includes an internal hinge slider 21 positioned inside the case 10 and an external hinge slider 23 positioned outside the case 10.

The internal hinge slider 21 has an upper side connected to the upper rail RL1 to be slidably movable through the upper slider SD1, and a lower side connected to the lower rail RL2 to be slidably movable through the lower slider SD2, in the inside between the external case 11 and the internal case 13.

The external hinge slider 23 is integrally connected to the internal hinge slider 21 from the outside of the external case 11 through the upper and lower guide slots SL1 and SL2, and has a tip portion is hinged to the door hinge bracket 3 through the hinge shaft 5.

Here, the external hinge slider 23 is formed as an upper external hinge bar 25, a lower external hinge bar 27, and an external connection bar 29.

That is, the upper external hinge bar 25 is integrally connected to an upper one side of the internal hinge slider 21 through an upper guide slot SL1 formed on an upper portion of the external surface of the external case 11 from the outside of the external case 11.

The lower external hinge bar 27 is integrally connected to one lower side of the internal hinge slider 21 through a lower guide slot SL2 formed on a lower portion of the external surface of the external surface of the external case 11 from the outside of the external case 11.

Furthermore, the external connection bar 29 is formed by interconnecting the upper and lower external hinge bars 25 and 27 from the outside of the external case 11.

Furthermore, the door hinge bracket 3 is configured as an upper door hinge bracket 3a and a lower door hinge bracket 3b.

That is, the upper door hinge bracket 3a is fixed to an upper side of one end portion of the door DR, and is hinged to the tip portion of the upper external hinge bar 25 through the hinge shaft 5.

Furthermore, the lower door hinge bracket 3b is fixed to a lower side of one end portion of the door DR, and is hinged to the tip portion of the lower external hinge bar 27 through the hinge shaft 5.

Furthermore, the driving unit 30 is configured so that a nut bracket 33 is provided on a screw 31 disposed inside the exterior and internal cases 11 and 13 in the longitudinal direction and is connected to the internal hinge slider 21 so that the hinge slider 20 slidably moves along the upper and lower rails RL1 and RL2 by driving a motor 35.

That is, the driving unit 30 includes the motor 35, a reducer 37, the screw 31, and the nut bracket 33.

The motor 35 is mounted and fixed to one side on the internal section of the internal case 13.

Here, as the motor 35, a step motor configured for controlling the number of rotations and a rotation direction may be applied.

The reducer 37 is configured on a motor shaft 35a of the motor 35 to reduce and output the rotation force of the motor 35.

The screw 31 is disposed in parallel to the upper and lower rails RL1 and RL2 inside the case 10 so that one end portion thereof is connected to an output side of the reducer 37, and the other end portion thereof is rotatably provided on the internal section of the internal case 13 through a bearing member 40.

Here, in the bearing member 40, a bearing 41 which rotationally supports the other end portion of the screw 31 is fastened and fixed to the internal case 13 through a bearing block 43.

The nut bracket 33 is movably provided on the screw 31, and has one side fixed to the internal hinge slider 21.

That is, the nut bracket 33 moves in front and rear directions on the screw 31 rotating by the rotational power of the motor 35 and transmits the rotational power as forward and backward power so that the hinge slider 20 slidably moves along the upper and lower rails RL1 and RL2.

Here, the screw 31 and the nut bracket 33 may have a ball screw structure in which rolling contact is made through a plurality of balls therebetween.

Furthermore, the striker 7 is fixed on one side of the internal case 13 corresponding to the bearing member 40 in the inside between the exterior and internal cases 11 and 13.

Here, the striker 7 may be formed in a rod shape, and may be fixed to a flange 13a protruding from the internal case 13.

The striker 7 is positioned to be constrained to the fixing latch portion 50 in a state in which the hinge slider 20 slidably moves in the diagonal direction outside the body.

The fixing latch portion 50 is provided on one lower side of the internal hinge slider 21 in the inside between the exterior and internal cases 11 and 13.

The fixing latch portion 50 operates to constrain or release the striker 7 through a claw lever 53 and a pawl lever 55 on a base plate 51, at a position where the hinge slider 20 slidably moves in the diagonal direction outside the body.

That is, the fixing latch portion 50 includes a base plate 51, the claw lever 53, the pawl lever 55, and a solenoid 57.

The base plate 51 is fixed to one lower side of the internal hinge slider 21, and an insertion groove 51a is formed in one side surface corresponding to the striker 7.

The claw lever 53 is rotatably coupled to the base plate 51 through a pin 53a in correspondence to the internal side of the insertion groove 51a. Furthermore, in the claw lever 53, a restraint groove 61 restraining the striker 7 is formed on one side, and an engaging end portion 63 limiting rotation in one direction is formed on the other side thereof.

The pawl lever 55 is rotatably coupled to the base plate 51 through a pin 55a in correspondence to one side of the claw lever 53. Furthermore, in the pawl lever 55, a support end portion 65 acting on the engaging end portion 63 is formed on one side, a locking groove 67 is formed on the other side, and a detection end portion 69 is formed to protrude from one side between the support end portion 65 and the locking groove 67.

The solenoid 57 is fixed to the base plate 51 in correspondence to one side of the pawl lever 55. Furthermore, the solenoid 57 is disposed so that an operation rod 57a acts on the locking groove 67 of the pawl lever 55.

The fixing latch portion 50 further includes a pawl switch 59 detecting a rotational position of the pawl lever 55. The pawl switch 59 is fixed to the base plate 51 in correspondence to the detection end portion 69 of the pawl lever 55.

The pawl switch 59 detects the rotation position of the pawl lever 55 and outputs a rotation position signal of the pawl lever 55 to control the operation of the solenoid 57 according to the signal.

Furthermore, the fixing latch portion 50 further includes a claw damper 71, a pawl damper 73, a claw spring 75, and a pawl spring 77.

The claw damper 71 is provided on one side of the base plate 51 in correspondence to one side surface of the engaging end portion 63 of the claw lever 53, and supports one side surface of the claw lever 53 to reduce a contact noise while suppressing rotation in one direction thereof.

Furthermore, the pawl damper 73 is provided on the other side of the base plate 51 in correspondence to one side surface of the support end portion 65 of the pawl lever 55, and supports the support end portion 65 of the pawl lever 55 to reduce the contact noise while suppressing rotation in one direction thereof.

The claw spring 75 is mounted onto the pin 53a of the claw lever 53 and is provided to elastically support the claw lever 53 in a rotation direction in which the restraint of the striker 7 is released.

Furthermore, the pawl spring 77 is mounted onto the pin 55a of the pawl lever 55 and is provided to elastically support the pawl lever 55 in a rotation direction in which the support end portion 65 supports the engaging end portion 63 of the claw lever 53.

Hereinafter, specific operations of a door hinge device for a vehicle according to various exemplary embodiments of the present disclosure will be described with reference to FIG. 9, FIG. 10 and FIGS. 11 and 12.

Figure 9:
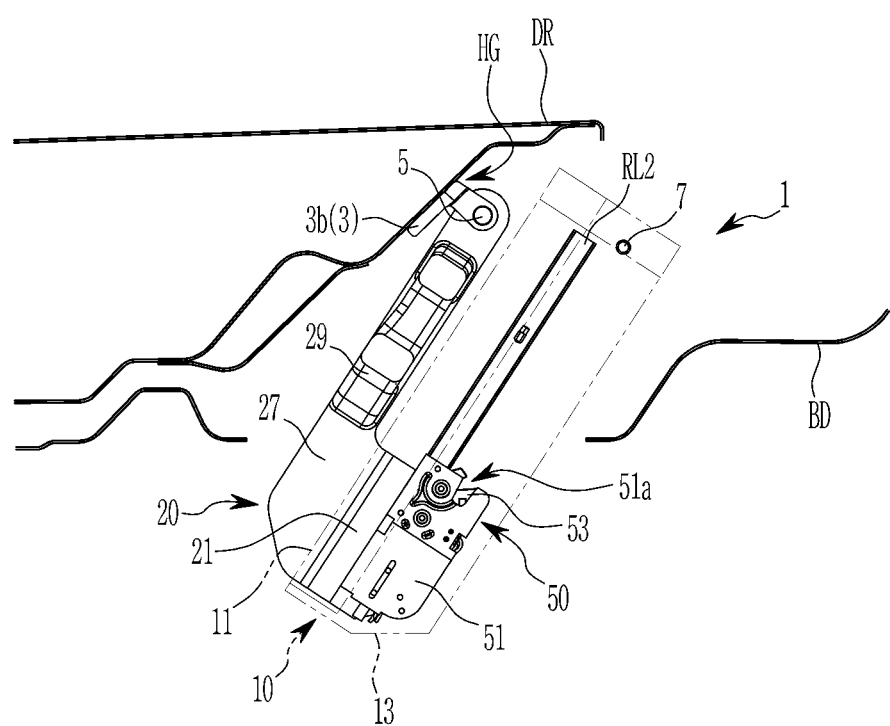
FIG. 9, FIG. 10 and FIG. 11 are flat cross-sectional views exemplarily illustrating operation states of the door hinge device for a vehicle for each step according to various exemplary embodiments of the present disclosure.
Figure 10:
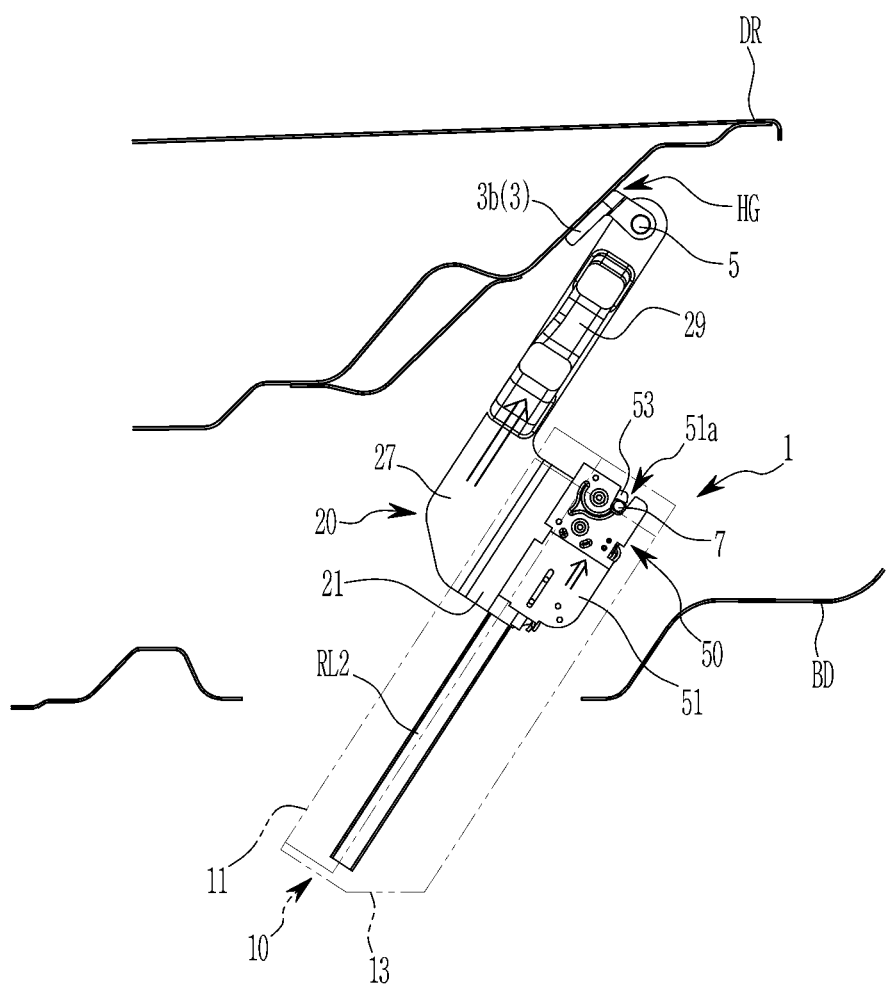
Figure 11:
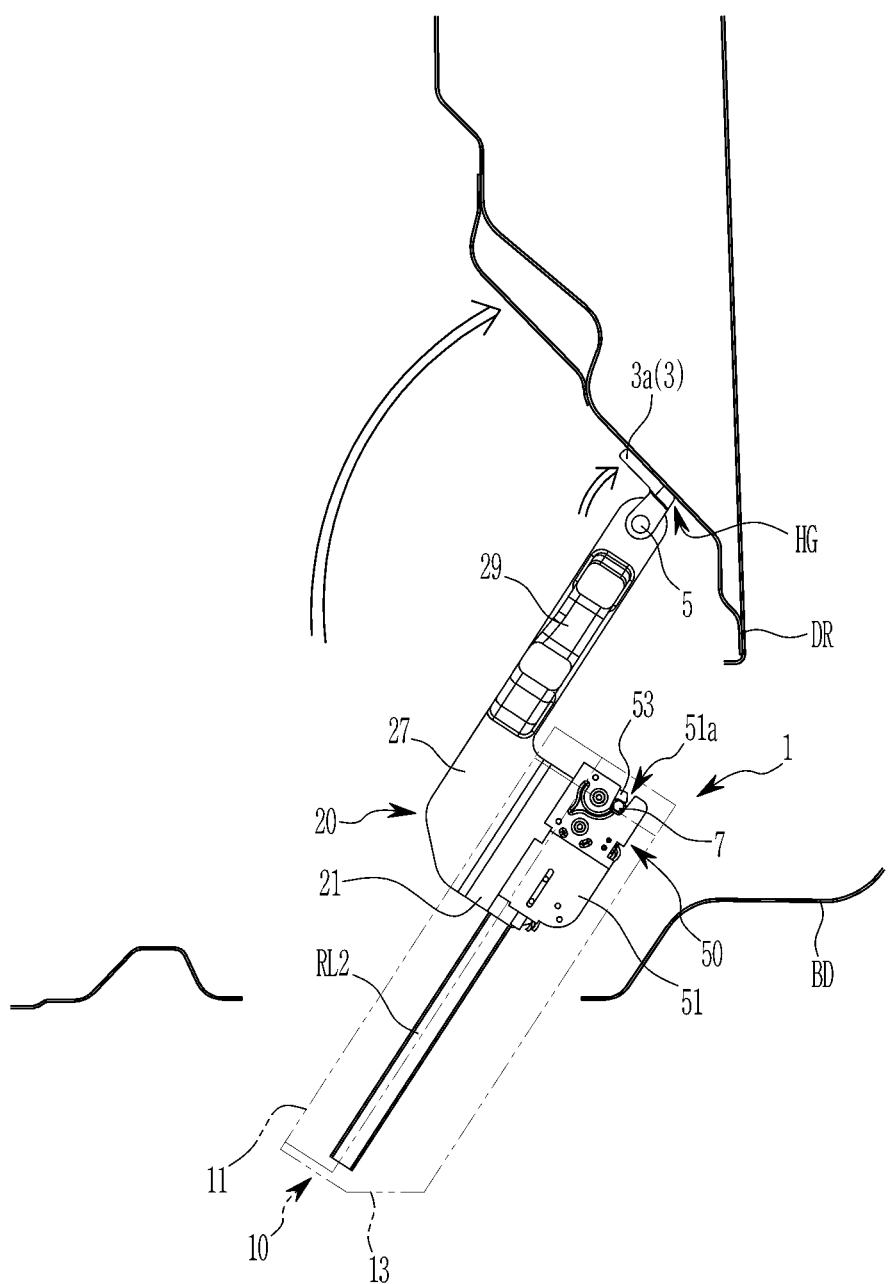
Figure 12:
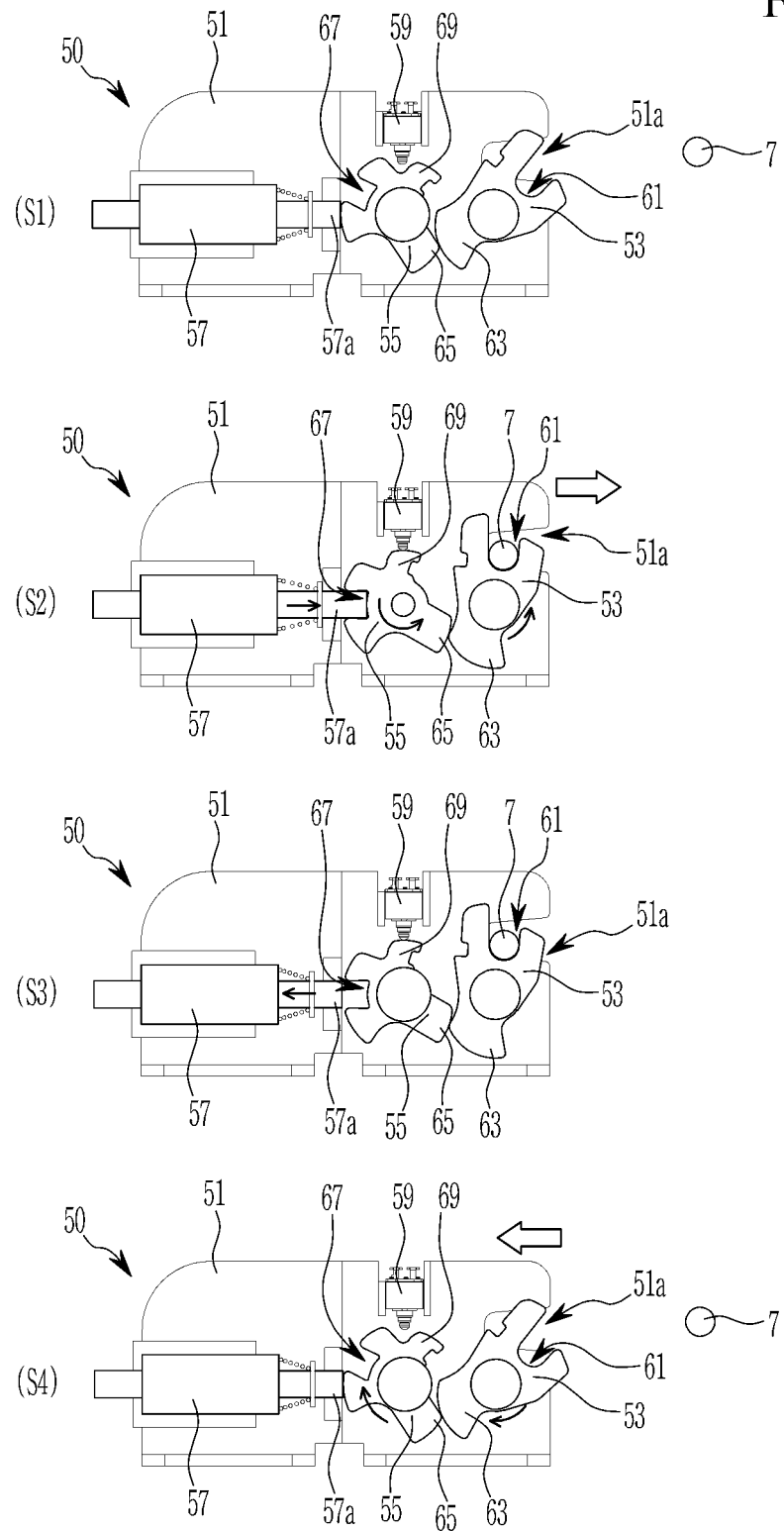
FIG. 12 is an operation state diagram of a fixing latch portion applied to the door hinge device for a vehicle for each step according to various exemplary embodiments of the present disclosure.

FIG. 9, FIG. 10 and FIG. 11 are flat cross-sectional views exemplarily illustrating operation states of the door hinge device for a vehicle for each step according to various exemplary embodiments of the present disclosure, and FIG. 12 is an operation state diagram of a fixing latch portion applied to the door hinge device for a vehicle for each step according to various exemplary embodiments of the present disclosure.

First, referring to FIG. 9, the door DR is in a closed state.

At the present time, in a state in which the hinge shaft 5 connecting the door DR and the body BD is moved in the diagonal direction inside the body BD together with the hinge slider 20, which is a position where one end portion of the door DR maintains a state where the door DR is closed.

At the present time, referring to step S1 of FIG. 12, in the fixing latch portion 50, the support end portion 65 of the pawl lever 55 is in a state separated from the engaging end portion 63 of the claw lever 53, and the claw lever 53 rotates by the claw spring 75 so that the constraint groove 61 of the claw lever 53 is in a state opened toward an insertion groove 51a of the base plate 51.

Furthermore, the pawl switch 59 is separated from the detection end portion 69 of the pawl lever 55 and does not output a detection signal, and accordingly, the solenoid 57 maintains the state in which the operation rod 57a is moved backward thereof.

Referring to FIG. 10, as described above, to open the door DR in the state in which the door DR is closed, first, the motor 35 is driven to rotate the screw 31 through the speed reducer 37. Accordingly, the nut bracket 33 connected onto the screw 31 moves in the diagonal direction to the outside of the body BD along the screw 31.

Accordingly, the hinge slider 20 fixedly connected to the nut bracket 33 slidably moves along the upper and lower rails RL1 and RL2 together with the nut bracket 33 in the diagonal direction outside the body BD.

At the present time, the hinge slider 20 moves the upper and lower door hinge brackets 3a and 3b respectively hinged to the tips of the upper and lower external hinge bars 25 and 27 of the external hinge slider 23 through the hinge shaft 5 in the diagonal direction outside the body BD.

Accordingly, in the door DR, a hinge portion HG with the body BD moves in the diagonal direction outside the vehicle body BD, so that a rotation trajectory is secured without interference with the body BD or the other door DR.

At the present time, referring to step S2 of FIG. 12, the fixing latch portion 50 is in a state constrained by the constraint groove 61 by the rotation of the claw lever 53 as the striker 7 is mounted onto the insertion groove 51a on the base plate 51.

That is, as the claw lever 53 rotates by the force into which the striker 7 is inserted, the engaging end portion 63 pushes the support end portion 65, and the pawl lever 55 rotates while overcoming an elastic force of the pawl spring 77 and restores rotation again in the opposite direction by the elastic force so that the support end portion 65 is in a position to support the engaging end portion 63.

Furthermore, the pawl switch 59 operates by the detection end portion 69 of the pawl lever 55 to output a detection signal, and accordingly, the solenoid 57 fixes the pawl lever 55 in the rotation direction so that the operation rod 57a moves forward and the tip portion of the operation rod 57a is inserted into the locking groove 67 of the pawl lever 55 to prevent the pawl lever 55 from rotating.

As described above, in a state in which the fixing latch portion 50 restrains the striker 7, a position of the door DR is fixed in the state in which the hinge portion HG with the body BD slidably moves in the diagonal direction outside the vehicle body BD.

Referring to FIG. 11, when the door DR is opened in a state in which the rotation trajectory of the door DR is secured as described above, the door DR is opened around the hinge shaft 5 without interference.

On the other hand, an operation of closing the door DR is performed opposite to an operation of opening, and thus a detailed description thereof is omitted, but the operation of the fixing latch portion 50 to open the door DR is referred to as follows.

To close the door DR, as in step S3 of FIG. 12, first, the operation rod 57a of the solenoid 57 is moved backward to be escaped from the locking groove 67 of the pawl lever 55.

In the present state, when the motor 35 of the driving unit 30 is driven in a reverse direction, the screw 31 is rotated in the reverse direction through the reducer 37. Accordingly, the nut bracket 33 moves in the diagonal direction inside the body BD along the screw 31, and the hinge slider 20 slidably moves in the diagonal direction inside the body BD along the upper and lower rails RL1 and RL2 together with the nut bracket 33.

At the present time, referring to step S4 of FIG. 12, as the striker 7 escapes from the insertion groove 51a on the base plate 51, the fixing latch portion 50 has the claw lever 53 rotating by the elastic force of the claw spring 75, and the restraint state of the striker 7 is released from the restraint groove 61.

At the present time, the support end portion 65 of the pawl lever 55 rotates by the elastic force of the pawl spring 77 by the rotation of the engaging end portion 63 of the claw lever 53 and release the support state of the engaging end portion 63.

Accordingly, in the vehicle door hinge device 1 according to the exemplary embodiment of the present disclosure, in a vehicle without a B-pillar, the hinge slider 20 connected to the hinge portion HG of the door DR slidably moves along the upper and lower rails RL1 and RL2 in the diagonal direction outside the body BD by the driving force of the motor 35 inside the case 10 to secure the rotation trajectory of the door DR. At the instant time, the vehicle door hinge device 1 according to the exemplary embodiment of the present disclosure fixes the slide movement position of the hinge slider 20 by restraining the striker 7 fixed to the case 10 through the fixing latch portion 50 on the hinge slider 20, and thus it is possible to open or close both doors DR simultaneously, and open or close even one door DR alone.

Furthermore, the hinge portion HG of the door DR slidably moves in the diagonal direction outside the body BD along the hinge slider 20 by the driving force of the motor 35, and then in the state where the striker 7 is restrained through the fixing latch portion 50 even if the motor 35 is not separately controlled, the slide movement position of the hinge slider 20 may be fixed, the door opening and closing operation may be stably achieved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door hinge apparatus for a vehicle, including a case provided in a diagonal direction toward outside of a body on one side of the body corresponding to one end portion of a door of the vehicle, rails disposed in a longitudinal direction, respectively on internal upper and lower sides of the case, and a hinge slider connected to a door hinge bracket fixed to the one end portion of the door through a hinge shaft while slidably movable provided along the rails inside the case, the door hinge apparatus comprising:
   a striker provided on one internal side of the case; and
   a fixing latch portion provided on one side of the hinge slider inside the case, and at a position where the hinge slider slidably moves in a diagonal direction outside the body, configured to constrain or release the striker through a claw lever and a pawl lever on a base plate.

2. The door hinge apparatus of claim 1,
   wherein the door includes a front door or a rear door, and
   wherein the one end portion of the door includes a front end portion of the front door or a rear end portion of the rear door.

3. The door hinge apparatus of claim 1, wherein the striker is fixed to an internal side of the case to be constrained to the claw lever in a state in which the hinge slider slidably moves in the diagonal direction outside the body.

4. The door hinge apparatus of claim 1, wherein the fixing latch portion includes:
   the base plate fixed to a lower side of the hinge slider and including an insertion groove formed at one side corresponding to the striker;
   the claw lever including a restraint groove restraining the striker on a first side thereof, an engaging end portion limiting rotation of the claw lever in one direction on a second side thereof, and rotatably pin-coupled to the base plate in correspondence to an internal side of the insertion groove;
   the pawl lever including a support end portion operating on the engaging end portion formed on a first side thereof, and a locking groove formed on a second side thereof, and rotatably pin-coupled to the base plate in correspondence to one side of the claw lever; and
   a solenoid including an operating rod selectively operating on the locking groove of the pawl lever and fixed to the base plate in correspondence to one side of the pawl lever.

5. The door hinge apparatus of claim 4, wherein the pawl lever further includes a detection end portion protruding from one side between the support end portion and the locking groove.

6. The door hinge apparatus of claim 5, wherein the fixing latch portion further includes a pawl switch fixed to the base plate in correspondence to the detection end portion of the pawl lever to detect a rotational position of the pawl lever by detecting a position of the detection end portion of the pawl lever.

7. The door hinge apparatus of claim 4, wherein the fixing latch portion further includes:
   a claw damper provided on a first side of the base plate to support a side surface of the claw lever and suppress a rotation of the claw lever; and
   a pawl damper provided on a second side surface of the base plate to support a side surface of the pawl lever and suppress a rotation of the pawl lever.

8. The door hinge apparatus of claim 4, wherein the fixing latch portion further includes:
   a claw spring mounted onto a pin of the claw lever to elastically support the claw lever in a rotation direction in which a restraint of the striker is released; and
   a pawl spring mounted onto a pin of the pawl lever to elastically support the pawl lever in a rotation direction in which the support end portion supports the engaging end portion of the claw lever.

9. The door hinge apparatus of claim 1, wherein the hinge slider includes:
- an internal hinge slider including each of upper and lower sides connected to be slidably movable along the rail through a slider inside the case; and
- an external hinge slider integrally connected to the internal hinge slider through a guide slot formed on an external surface of the case outside the case, and including a tip portion hinged to the door hinge bracket through the hinge shaft.

10. The door hinge apparatus of claim 9, wherein the external hinge slider includes:
- an upper external hinge bar integrally connected to an upper side of the internal hinge slider through an upper guide slot formed in an upper external surface of the case outside the case;
- a lower external hinge bar integrally connected to a lower side of the internal hinge slider through a lower guide slot formed in an external lower surface of the case from outside the case; and
- an external connection bar connecting the upper and lower external hinge bars outside the case.

11. The door hinge apparatus of claim 10, wherein the door hinge bracket includes:
- an upper door hinge bracket fixed to an upper side of the door and hinged to a tip portion of the upper external hinge bar through the hinge shaft; and
- a lower door hinge bracket fixed to a lower side of the door and hinged to a tip portion of the lower external hinge bar through the hinge shaft.

12. The door hinge apparatus of claim 1, further including:
- a driving unit including a screw, a nut bracket movably provided on the screw and including one side fixed to the hinge slider, and a motor and configured to provide a driving force so that the hinge slider, to which the nut bracket provided on the screw disposed in the longitudinal direction inside the case is connected, slidably moves along the rail according to driving of the motor.

13. The door hinge apparatus of claim 12,
wherein the motor is fixed on an internal section of the case,
wherein the screw is disposed in parallel to the rail and includes a first end portion engaged to a motor shaft of the motor and a second end portion rotatably provided on the internal section of the case.

14. The door hinge apparatus of claim 13, wherein the driving unit further includes:
- a reducer engaged to the motor shaft of the motor to reduce and output a rotation force of the motor,
wherein the screw is disposed in parallel to the rail and includes the first end portion connected to the reducer and the second end portion rotatably provided on the internal section of the case through a bearing member.

* * * * *